(12) United States Patent
Esser et al.

(10) Patent No.: US 8,406,629 B2
(45) Date of Patent: Mar. 26, 2013

(54) ARCHITECTURE TO COMMUNICATE WITH STANDARD HYBRID FIBER COAXIAL RF SIGNALS OVER A PASSIVE OPTICAL NETWORK (HFC PON)

(75) Inventors: Shawn M. Esser, Blue Bell, PA (US); Philip Miguelez, Warminster, PA (US); Fred Slowik, Lansdale, PA (US)

(73) Assignee: General Instrument Corporation, Horsham, PA (US)

( * ) Notice: Subject to any disclaimer, the term of this patent is extended or adjusted under 35 U.S.C. 154(b) by 786 days.

(21) Appl. No.: 11/942,262

(22) Filed: Nov. 19, 2007

(65) Prior Publication Data

US 2008/0124083 A1 May 29, 2008

Related U.S. Application Data

(60) Provisional application No. 60/866,906, filed on Nov. 22, 2006.

(51) Int. Cl.
*H04J 14/00* (2006.01)
(52) U.S. Cl. ............................... 398/74; 398/68; 398/72
(58) Field of Classification Search .............. 398/66–68, 398/70–72, 74
See application file for complete search history.

(56) References Cited

U.S. PATENT DOCUMENTS

| | | | | |
|---|---|---|---|---|
| 5,606,725 | A * | 2/1997 | Hart | 725/131 |
| 6,490,727 | B1 * | 12/2002 | Nazarathy et al. | 725/129 |
| 6,493,335 | B1 * | 12/2002 | Darcie et al. | 370/344 |
| 7,271,948 | B1 * | 9/2007 | Wang et al. | 359/334 |
| 2001/0055319 | A1 | 12/2001 | Quigley et al. | |
| 2002/0163705 | A1 | 11/2002 | Bakker et al. | |
| 2002/0164127 | A1 | 11/2002 | Barker et al. | |
| 2003/0194241 | A1 | 10/2003 | Farmer | |
| 2005/0213992 | A1 * | 9/2005 | Piehler | 398/198 |

OTHER PUBLICATIONS

PCT International Search Report for PCT/US07/85156—dated Mar. 7, 2008.
U.S. Appl. No. 11/616,951 Nov. 28, 2006.
"ONT Management and Control Interface Specification for B-PON—Series G: Transmission Systems and Media, Digital Systems and Networks, Digital Sections and Digital Line System—Optical Line Systems for Local and Access Networks", International Telecommunication Union, Telecommunication Standardization Sector of ITU, ITU-T Recommendation G.983.2, Jul. 2005.
"Gigabit-Capable Passive Optical Networks (GPON): General Characteristics—Series G: Transmission Systems and Media, Digital Systems and Networks, Digital Sections and Digital Line System—Optical Line Systems for Local and Access Networks", International Telecommunication Union, Telecommunication Standardization Sector of ITU, ITU-T Recommendation G.984.1, Mar. 2003.
"Gigabit-Capable Passive Optical Networks (G-PON): ONT Management and Control Interface Specification, Amendment 2—Series G: Transmission Systems and Media, Digital Systems and Networks, Digital Sections and Digital Line System—Optical Line Systems for Local and Access Networks", International Telecommunication Union, Telecommunication Standardization Sector of ITU, ITU-T Recommendation G.984.4, Amendment 2, Mar. 2006.

* cited by examiner

*Primary Examiner* — Dalzid Singh
(74) *Attorney, Agent, or Firm* — Lori Anne D. Swanson

(57) ABSTRACT

One or more overlay wavelengths are applied to a GPON architecture to provide sufficient, cost-effective forward bandwidth per home for targeted, unique narrowcast services to allow traditional HFC operators to use a PON architecture with their existing HFC equipment. A separate return path capability using a separate coaxial cable with RF signals to the GPON may also be used. This return capability may be provided either by a fiber optic link or coaxial link from the home.

7 Claims, 4 Drawing Sheets

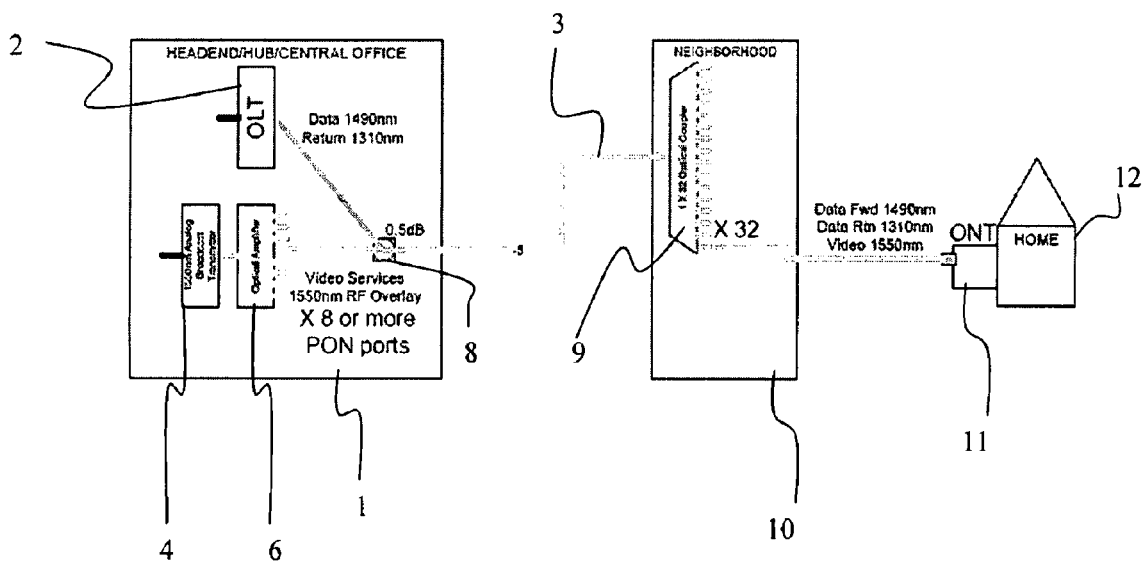
Figure 1
(PriorArt)

ARCHITECTURE TO COMMUNICATE WITH STANDARD HYBRID FIBER COAXIAL RF SIGNALS OVER A PASSIVE OPTICAL NETWORK (HFC PON)

This application claims the benefit of U.S. Provisional Ser. No. 60/866,906 filed on Nov. 22, 2006, herein incorporated by reference in its entirety.

BACKGROUND OF THE INVENTION

Modern cable telecommunications systems are typically built with a Hybrid Fiber Coaxial (HFC) network topology to deliver services to residences and businesses. By using Frequency Division Multiplexing, multiple services on these systems are carried on Radio Frequency (RF) signals in the 5 MHz to 1000 MHz frequency band. The HFC topology carries the RF signals in the optical domain on fiber optic cables between the headend/hub office and the neighborhood, and then carries the RF signals in the electrical domain over coaxial cable to and from the home. The fiber optic signals are converted to and from electrical RF signals in a device called a fiberoptic "node." In the coaxial portion of the network, the signal is split to different housing areas and then tapped off to the individual homes. The RF signals continue to be transported through the home on coaxial cables and connected to devices in the home. Due to attenuation in the coaxial cable and split/tap losses, "RF amplifiers" are used periodically in the coaxial plant to amplify the electrical signal so they are at an acceptable level to be received by the devices at the home.

Information is transported from the headend/hub office to the home, such as video, voice and internet data, over the HFC network. Also, information is transported back from the home to the headend/hub office, such as control signals to order a movie or internet data to send an email. The HFC network is bi-directional, meaning that signals are carried on the same network from the headend/hub office to the home, and from the home to the headend/hub office. The same coaxial cable actually carries the signals in both directions. In order to do this, the frequency band is divided into two sections, "forward path" and "return path", so there is no interference of signals. The "forward path" or "downstream" signals, which typically occupy the frequencies from 52 MHz to 1000 MHz, originate in the headend or hub as an optical signal, travel to the node, are converted to electrical RF in the node, and then proceed to the home as electrical signals over coaxial cable. Conversely, the "return path" or "upstream" signals, which typically occupy the frequencies from 5 MHz to 42 MHz, originate in the home and travel over the same coaxial cable as the "forward path" signals. The electrical signals are converted to optical signals in the node, and continue to the hub or headend over fiber optic cables.

The HFC network is capable of carrying multiple types of services: analog television, digital television, video-on-demand, high-speed broadband internet data, and telephony. Cable Multiple System Operators (MSOs) have developed methods of sending these services over RF signals on the fiber optic and coaxial cables. Video is transported using standard analog channels which are the same as over-the-air broadcast television channels, or digital channels which are usually MPEG2 signal over a QAM channels. The most common method for carrying data services, telephony services and sometimes video, is Data-Over-Cable Service Interface Specification (DOCSIS). In order to transport information on RF signals, the MSOs have a significant amount of equipment that converts the services so they can be carried on RF signals. Examples of this equipment would be Cable Modem Termination Systems (CMTS), QAM modulators, Upconvertors and Digital Access Controller (DAC). Also, devices in the home are required to convert the RF signals to signals that are compatible with television sets, computers and telephones. Examples of these devices are television set-top boxes, cable modems and Embedded Multimedia Terminal Adapter (EMTA). These devices select the appropriate forward path signals and convert them to usable signals in the home. These same devices also generate the return path signals to communicate back to the headend/hub office. MSOs have a significant investment in the equipment at the home and headend/hub offices that utilize DOCSIS and similar protocols. They also have a significant network operation investment to manage this type of network with regards to maintenance and customer service.

Today, the MSOs are facing competition from traditional telecommunication companies. These companies are utilizing new technologies where fiber optic cables are laid very close to the home, called Fiber-to-the-Curb (FTTC), or all the way to the home, called Fiber-to-the-Home (FTTH). With these technologies, many more services and higher quality can be delivered to the homes, while also lowering the maintenance cost of the network because the active components are reduced. A common type of FTTH network is Passive Optical Network (PON) where no active components exist between the headend/hub/central office and the home. There are several types of PON's including Broadband PON (BPON) and Gigabit-capable PON (GPON) which are actively being deployed by telecommunication companies in the United States. The technical standard for the BPON is defined in ITU-T Recommendation G.983 and for the GPON is defined in ITU-T Recommendation G.984. For the sake of this disclosure, the GPON will be used as the reference since this is the latest PON architecture being actively deployed, but this invention can apply to other forms of PONs.

FIG. 1 shows a typical architecture for a GPON and FIG. 2 shows a typical ONT for a GPON. As illustrated in FIG. 1, a forward path of a typical GPON network contains headend 1 with a broadcast transmitter 4 and optical amplifier 6, and a wave division MUX/deMUX 8, which provides communication to a 1×n optical coupler 9 at node 10 over optical fiber 3 to couple n homes 12 to the communication signal. At the home 12, an Optical Network Termination unit 11 (ONT) converts the optical forward signals via optical triplexer 14 containing receivers 15 and 17 and transmitter 16. Interface module 13 provides the Ethernet signals to Ethernet output 19 for internet data, the POTS signals to RJ11 twisted pair wires 18 for telephone, and broadcast signals to coaxial cable output 20 for television (if the video overlay is used). In the return path, the ONT converts the Ethernet input and RJ11 twisted pair to an optical baseband digital signal. Any television return signals utilize the Ethernet input. At the headend/hub/central office, the GPON utilizes the OLT 2 system as the interface between the PON and network-side.

Instead of using DOCSIS and similar protocols like an HFC network, the GPON utilizes baseband digital protocol for forward path and return path signals. The forward path baseband digital signals carry internet data, telephony and sometimes television service by using Internet Protocol (IPTV). The GPON also has an option for a forward overlay wavelength to provide enhanced services to the home. Often, the overlay wavelength is at 1550 nm and delivers video services in the forward path using Frequency Division Multiplexing just as the HFC network. This overlay wavelength is shared over many homes, up to 10000. Unlike the HFC Network though, the only option for return signals on the GPON is using the baseband digital return signal. Because of the method that information is transported, the GPON utilizes vastly different equipment at the home and headend/hub/central office 1 compared to HFC network.

MSO's cannot utilize their current methods of transporting information over a PON, and therefore cannot utilize their current headend/hub equipment and home devices in this architecture. In order to compete with the telecommunication companies, MSOs would like to migrate to FTTH networks, such as GPON, to offer perceived and real increases in services and quality. MSOs have a very large investment in DOCSIS and similar equipment at the headend/hub office and the home, which cannot be utilized in a GPON network. Also the network management systems for maintenance and customer service are built around DOCSIS equipment and, therefore, running a second system in parallel would be costly.

Technical issues exist for utilizing the MSO's current infrastructure equipment in a GPON network. For example, the GPON network cannot provide sufficient, cost-effective forward bandwidth per home for targeted, unique narrowcast services if they are transported using the overlay 1550 nm wavelength. To be cost-effective, the GPON overlay wavelength is split many times and feeds many homes, up to 10000, with the same signal. This is acceptable in current GPON deployments because only broadcast video services are transported on the overlay wavelength, and all narrowcast services, such as internet data and telephony, are transported on the baseband digital signal. In order to use their current infrastructure, the MSO would also transport narrowcast services using RF signals on the overlay wavelength in the forward path. But in this scenario, all homes would share the same narrowcast bandwidth which would severely limit the amount of unique services available for each home.

Further, the MSO's current equipment converts information to be carried over RF signals in the return path. GPON has no option to carry RF signals in the return path.

BRIEF DESCRIPTION OF THE DRAWINGS

FIG. 1 illustrates an exemplary GPON architecture with broadcast overlay wavelength.

DETAILED DESCRIPTION

This disclosure utilizes multiple approaches to solve the above problems. These approaches can be used together or separately in a network. In one approach a second overlay wavelength is added to the GPON architecture so it can provide sufficient, cost-effective forward bandwidth per home for targeted, unique narrowcast services. The invention may also or alternatively add return path capability using RF signals to the GPON. This return capability may be provided either by a fiber optic link or coaxial link from the home.

Figure 2:
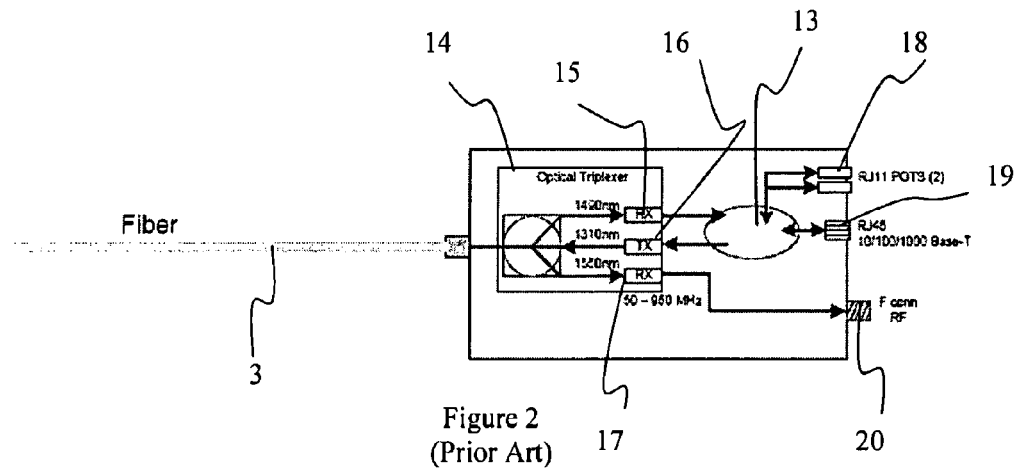
FIG. 2 illustrates an exemplary GPON ONT with broadcast overlay capability.
Figure 3:
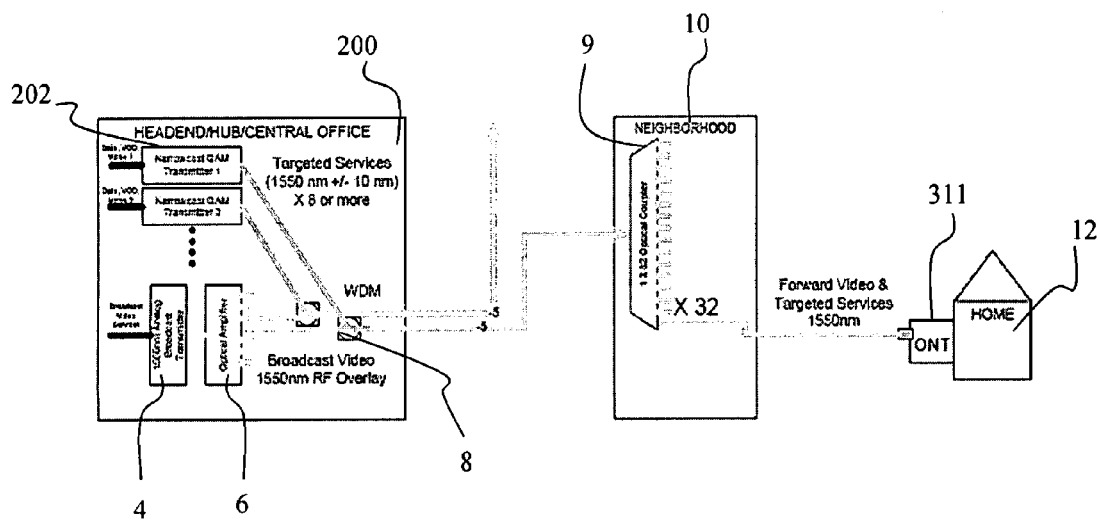
FIG. 3 illustrates an exemplary GPON architecture with the broadcast and narrowcast overlay wavelengths in the forward path.

FIG. 3 illustrates an exemplary architecture with the broadcast and narrowcast overlay wavelengths in the forward path.

In this embodiment, another overlay wavelength is inserted into each 1550 nm PON port from the optical amplifier in the headend/hub/central office 1 via narrowcast transmitters 202, which may be QAM transmitters. This wavelength contains the unique, targeted narrowcast services and the number of homes sharing this signal is much smaller, for example, as few as 32 homes, so the available bandwidth per home is significantly more than provided in a traditional GPON network. A narrowcast transmitter 202 is used to generate this second overlay wavelength, which is wave division multiplexed at MUX/deMUX 8 with a broadcast signal provided by broadcast transmitter 4 and amplifier 6. A narrowcast transmitter is generally defined as fiber optic device that transmits only up to 400 MHz of targeted services delivered on QAM channels, and it is much less expensive than a broadcast transmitter which requires much higher performance. The narrowcast overlay wavelength is offset from the 1550 nm broadcast overlay wavelength so it can be efficiently combined with the 1550 nm wavelength, but it would still be passed along with the 1550 nm wavelength through optical passives in the GPON. A wavelength division multiplexer (WDM) is used to insert this wavelength with the 1550 nm broadcast at the headend/hub/central office. ONT 311 provides the broadcast and narrowcast signals to the user through ports 18, 19 and 20.

The inventors provide two techniques for transporting RF signals in the return path. One is to add an analog return transmitter to the ONT and add a second fiber optic link to the GPON so return RF signals are transported from the home to the headend/hub office. Another is to add a coaxial cable link to the GPON to carry the return RF signals from the home to an optical node, and then to the headend/hub office.

Figure 4:
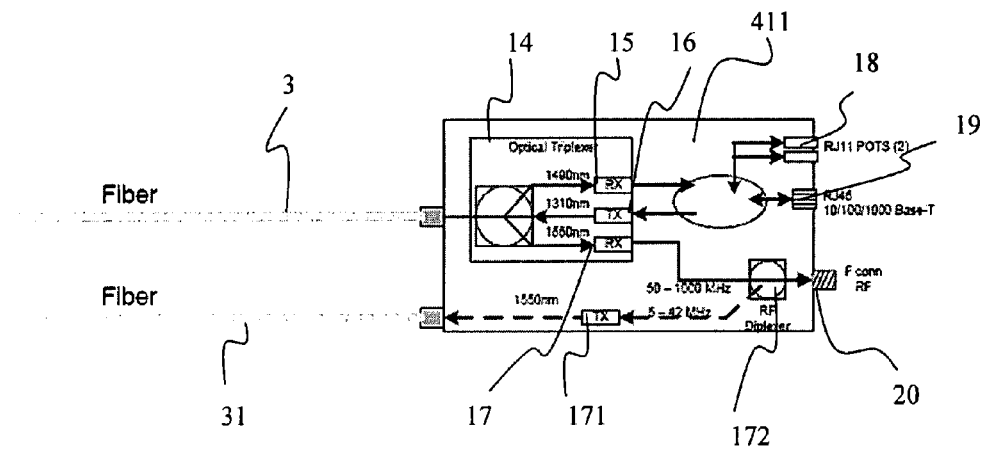
FIG. 4 illustrates an exemplary modified GPON ONT with a second optical return transmitter.
Figure 5:
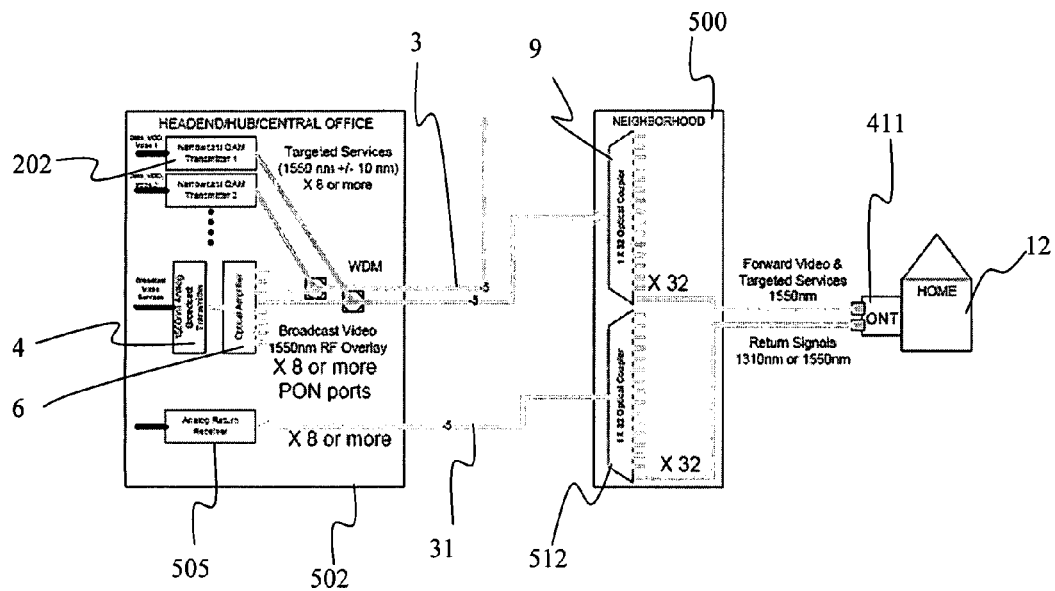
FIG. 5 illustrates an exemplary architecture with broadcast and narrowcast overlay wavelengths and second optical return signal.

FIG. 4 illustrates an exemplary modified GPON ONT with a second optical return transmitter and FIG. 5 illustrates an exemplary architecture with broadcast and narrowcast overlay wavelengths and second optical return signal. The modified GPON utilizes the coaxial cable in the home for both forward path and return path signals, which may be the same way it is utilized in a HFC network. The ONT 411 is modified to include a RF diplexer 172 and second return optical transmitter 171. The RF diplexer 172 splits off the return RF signals (typically from 5 MHz to 42 MHz/65 MHz) coming from the home. By using a pluggable RF diplexer, the frequency range for the return signals could be changed (for example, from 5 MHz up to 105 MHz). These RF signals are directed to an analog transmitter 171 which converts the RF signals from the electrical to the optical domain. The wavelength of this second transmitter may be at any wavelength, but most likely 1310 nm or 1550 nm. FIG. 4 shows the modified GPON ONT with a second Optical Return Transmitter.

The analog optical return signal is transported from the home on a second fiber optic cable 31. This is preferred because the optical passives in the GPON generally cannot handle a second return wavelength. This optical return signal is combined with optical return signals from other homes using an optical coupler 512 (i.e. 1×32) in node 500. The combined signals then travels to the headend/hub office 502 and received by a return analog optical receiver 505 where it is converted to back to an electrical signal.

This embodiment may rely on the standard protocols used today by the MSOs such as DOCSIS, ALOHA, or similar protocols to allow for proper timing, data collision control, distance ranging and RF power, as appreciated by those of skill in the art.

This embodiment combines multiple return optical signals onto one fiber. The challenge with this is that if two or more return lasers are transmitting at the same time, noise can be generated due to non-linear mixing of the two optical carriers.

Also, lasers will typically generate noise if they are not transmitting data, which would impact the ability of the optical receiver to detect the return signal from the active home. Accordingly, in a preferred implementation, the lasers are turned off if the transmitters are not receiving RF signals from the home, and turned on when the transmitter receives a RF signal from devices in the home. By using the timing from the standard protocols, only one of the lasers in a PON group (32 homes) would be turned on and transmitting at a frequency at any given time.

Figure 6:
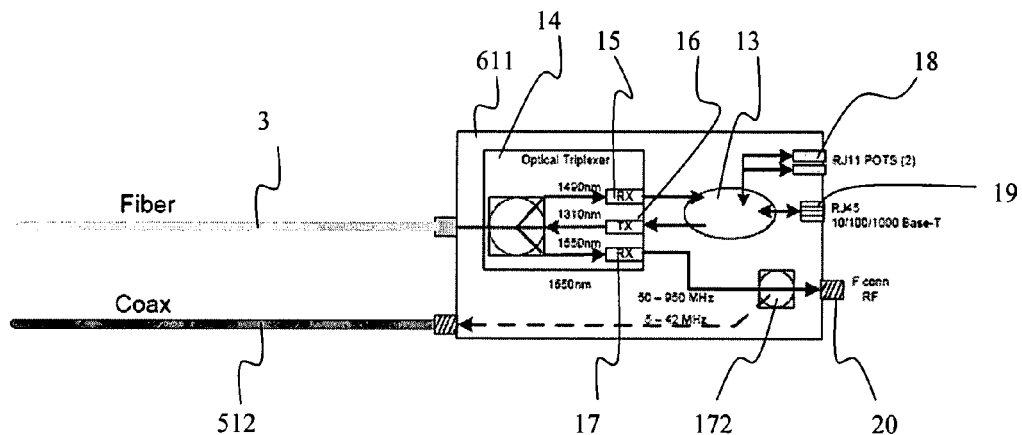
FIG. 6 illustrates an exemplary modified GPON ONT with a coaxial return RF signal.
Figure 7:
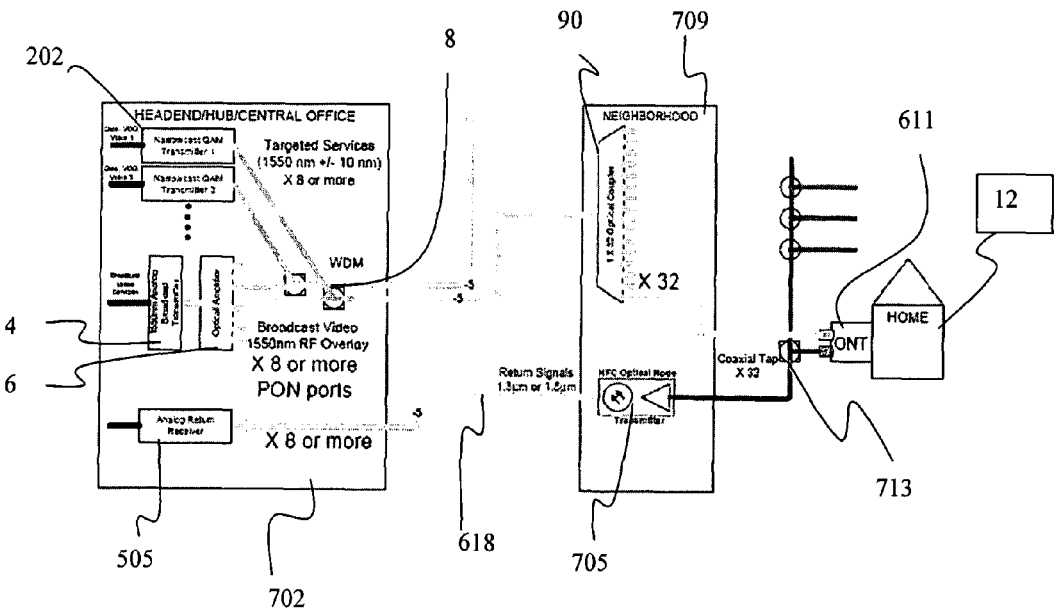
FIG. 7 illustrates an exemplary architecture with broadcast and narrowcast overlay wavelengths and electrical coaxial return RF signal.

FIG. 6 illustrates an exemplary modified GPON ONT with a coaxial return RF signal and FIG. 7 illustrates an exemplary architecture with broadcast and narrowcast overlay wavelengths and electrical coaxial return RF signal. Just like in FIGS. 4 and 5, the modified GPON utilizes the coaxial cable in the home for both forward path and return path signals, which may be the same way it is utilized in a typical HFC network. The ONT 611 is modified to include a RF diplexer 172. The RF diplexer splits off the return RF signals (typically from 5 MHz to 42 MHz/65 MHz) coming from the home. By using a pluggable RF diplexer, the frequency range for the return signals could be changed (for example, to 5 MHz to 105 MHz). The difference with FIGS. 4 and 5, is that the return network is similar to today's HFC network. These return RF signals are passed through the ONT 611 to a coaxial cable 512 from the house to the street. The return signals from the home are combined with return signals from other homes through electrical RF tap couplers 713. These combined returned signals eventually feed into an HFC-type optical node 709. At node 709, the return RF signals are converted to the optical domain via transmitter 705 and sent to the headend/hub office 702.

A variation of this embodiment is to have the RF diplexer 172 external to the ONT 611. This discrete RF diplexer is on the coaxial cable on the home-side which splits off the return RF signals. The return RF signals are routed from the ONT 611 on a coaxial cable that goes to the street.

Similar to FIGS. 4 and 5, this embodiment may also rely on the standard protocols used today by the MSOs such as DOCSIS, ALOHA, or similar protocols to allow for proper timing, data collision control, distance ranging and RF power, as appreciated by those of skill in the art.

Figure 8:
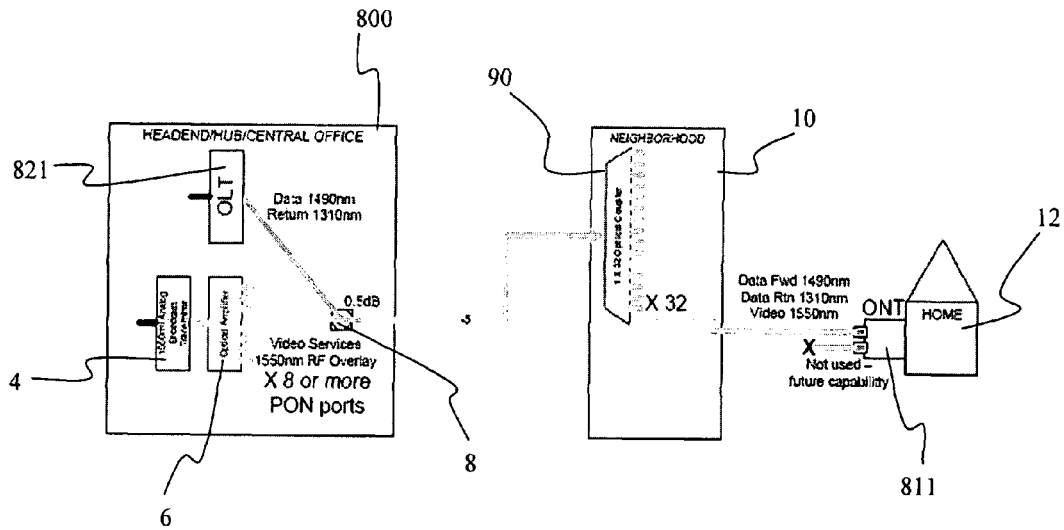
FIG. 8 illustrates an exemplary migration to GPON.

FIG. 8 illustrates a migration of an HFC network to GPON. The embodiments above leave intact the ONT components that handle the GPON digital baseband signals for forward path and return path. These are not used in the initial deployment of this proposed embodiment if all services are using RF signals in the forward and return path. If these ONT components are left intact, the architectures outlined above allow a migration to a GPON without a truck-roll to the home or replacing the ONT. In order to do this, the GPON OLT 821 is added at the headend/hub office 800 and the wavelengths are inserted or dropped using a WDM. At the home, computers are unconnected from the cable modem and connected to the RJ45 port on the ONT 811 with CAT5 cable. The telephones are connected to the RJ11 ports on the ONT. For video services, the set-top box would likely need to be changed to be compatible with IP over Ethernet. The secondary fiber optic link or coaxial link used for return RF signals is no longer used but could be left in place for future bandwidth capability.

As an extension of the inventions, the ONT components used for GPON digital baseband signals could be removed for cost savings. If this is done, the architecture cannot be migrated to a GPON or other type of PON without replacing the ONT.

The present invention allows MSOs to largely use their existing HFC network architecture in a PON architecture. This allows the MSOs to utilize the benefits of a PON architecture in a cost effective manner which takes advantage of their investment in their existing architecture. It also allows the MSO to use familiar operating and signaling techniques in a PON architecture to maintain reliability of service which achieving extended bandwidth to customers.

Those of skill in the art will appreciate that the above embodiments may be modified without departing from the sprit of the invention. For example, the RF signals in the return path may be carried over medium other than a coaxial cable, such other communication cables, or even twisted pair.

What is claimed is:

1. A system for communicating over a passive optical network (PON), comprising:
   a headend comprising:
      a broadcast transmitter which transmits broadcast television signals over an optical fiber;
      a narrowcast transmitter which transmits narrowcast signals; and
      a wave division multiplexer which multiplexes the broadcast television signals and a narrowcast signals;
   an optical network termination (ONT) unit which converts optical signals to electrical signals at an endpoint of the passive optical network; and
   a node which includes a return optical transmitter which converts return RF signals to return optical signals for transmission to the headend,
   wherein the ONT unit includes an RF transmitter for transmitting a return RF signal over a coaxial cable.

2. The system for communicating over a PON of claim 1, wherein the headend further comprises a return receiver which is configured to receive return signals from the passive optical network.

3. The system for communicating over a PON of claim 1, wherein the ONT unit includes a return optical transmitter which transmits a return optical signal over a different optical fiber than that which provides optical signals.

4. The system for communicating over a PON of claim 1, wherein the ONT comprises a return analog optical transmitter which transmits a return optical signal.

5. A optical network termination (ONT) unit for use in a passive optical network (PON) comprising:
   an optical receiver which receives optical communications from a headend through an optical fiber associated with the PON;
   at least one interface port which provides for a connection to an external user device; and
   a return path which provides a return communication to the headend through a transmission medium which does not include the optical fiber on which the optical communications are received from the PON,
   wherein an interface port of the at least one interface port provides communications to a user device from the PON and provides the return communication to the PON from the user device,
   wherein the return path includes an RF diplexer which receive communications from the PON to the user device and return communications from the user device to the PON, and places the return communications in the return path.

6. The ONT of claim 5, wherein the return path includes an optical transmitter which transmits the return communications to the headend over a return optical fiber.

7. The ONT of claim 5, wherein the return path includes an RF transmitter which transmits the return communications over a coaxial cable.

* * * * *